(12) United States Patent
Yun et al.

(10) Patent No.: US 9,338,680 B2
(45) Date of Patent: May 10, 2016

(54) APPARATUS AND METHOD FOR MEASURING A FEMTO BASE STATION OF USER EQUIPMENT REGISTERED TO FEMTO BASE STATION IN MOBILE COMMUNICATION SYSTEM

(75) Inventors: Il-Kwon Yun, Yongin-si (KR); Yang-Ick Joo, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 979 days.

(21) Appl. No.: 12/891,037

(22) Filed: Sep. 27, 2010

(65) Prior Publication Data

US 2011/0076960 A1 Mar. 31, 2011

(30) Foreign Application Priority Data

Sep. 29, 2009 (KR) ........................ 10-2009-0092275

(51) Int. Cl.
| | |
|---|---|
| H04W 36/00 | (2009.01) |
| H04W 24/10 | (2009.01) |
| H04W 52/02 | (2009.01) |
| H04W 36/30 | (2009.01) |
| H04W 68/00 | (2009.01) |
| H04W 84/04 | (2009.01) |

(52) U.S. Cl.
CPC .......... *H04W 24/10* (2013.01); *H04W 52/0216* (2013.01); *H04W 36/30* (2013.01); *H04W 68/00* (2013.01); *H04W 84/045* (2013.01)

(58) Field of Classification Search
CPC ... H04W 84/045; H04W 88/08; H04W 24/10; H04W 36/0083; H04W 36/30; H04W 48/20; H04W 24/02; H04W 36/08; H04W 36/32; H04W 12/08; H04W 40/248; H04W 28/0226; H04W 28/0268; H04W 52/244; H04W 64/00; H04W 92/20; H04W 52/0216; H04W 48/08; H04W 36/0061; H04W 72/0426; H04W 52/0206; H04W 88/10; H04W 48/02; H04W 48/06; H04W 52/40; H04W 68/04; H04L 5/0073; H04L 1/1812
USPC ........... 455/436, 67.14, 422.1, 458, 444, 446; 370/328, 331
See application file for complete search history.

(56) References Cited

U.S. PATENT DOCUMENTS

| 8,504,072 B2 | 8/2013 | Ishii et al. |
| 2008/0069028 A1 | 3/2008 | Richardson |
| 2008/0298275 A1 | 12/2008 | De Sousa |

(Continued)

FOREIGN PATENT DOCUMENTS

| JP | 2009-77368 A | 4/2009 |
| KR | 10-2009-0045183 A | 5/2009 |
| WO | 98/44748 A2 | 10/1998 |

*Primary Examiner* — Nimesh Patel
(74) *Attorney, Agent, or Firm* — Jefferson IP Law, LLP

(57) ABSTRACT

An apparatus and a method for measuring a signal from a femto Base Station (BS) of a User Equipment (UE) registered to the femto BS in a mobile communication system are provided. An operating method of a femto BS for measuring the signal from the femto BS of a UE registered to the femto BS in a mobile communication system where the femto BS and a macro BS coexist, includes, when the UE registered to the femto BS is located in a service coverage area of the macro BS, generating a paging message informing of the existence of the femto BS, and sending the generated paging message to the UE. The UE measures the signal from the femto BS based on the paging message, generates a measurement report message including a measurement result, and sends the generated measurement report message to the macro BS.

32 Claims, 11 Drawing Sheets

(56) References Cited

U.S. PATENT DOCUMENTS

| | | | |
|---|---|---|---|
| 2009/0005046 A1* | 1/2009 | Won et al. ..................... | 455/436 |
| 2009/0129341 A1* | 5/2009 | Balasubramanian et al. ............................ | 370/331 |
| 2009/0280819 A1* | 11/2009 | Brisebois et al. ............. | 455/446 |
| 2009/0325634 A1* | 12/2009 | Bienas et al. ............... | 455/552.1 |
| 2010/0130212 A1* | 5/2010 | So et al. ........................ | 455/444 |
| 2010/0267386 A1* | 10/2010 | Lim et al. ..................... | 455/436 |

\* cited by examiner

APPARATUS AND METHOD FOR MEASURING A FEMTO BASE STATION OF USER EQUIPMENT REGISTERED TO FEMTO BASE STATION IN MOBILE COMMUNICATION SYSTEM

PRIORITY

The present application claims the benefit under 35 U.S.C. §119(a) to a Korean patent application filed in the Korean Intellectual Property Office on Sep. 29, 2009, and assigned Serial No. 10-2009-0092275, the entire disclosure of which is hereby incorporated by reference.

BACKGROUND OF THE INVENTION

1. Field of the Invention

The present invention relates to an apparatus and a method for measuring a signal from a femto base station in a mobile communication system. More particularly, the present invention relates to an apparatus and a method for measuring a signal from a femto base station of a user equipment registered to the femto base station in a mobile communication system.

2. Background of the Invention

In a cellular wireless communication system, a geographical condition in a cell, a distance between a user equipment and a base station, or movement of the user equipment may deteriorate a channel condition and block the communication between the user equipment and the base station. For example, even in the service coverage area of the base station, a sealed structure such as office or house forms a shadow area. In a case where the user equipment travels in the shadow area, the base station may not smoothly communicate with the user equipment because of the poor channel condition between the base station and the user equipment.

To address this service problem in the shadow area and to offer a high-rate data service, the wireless communication system may provide a femtocell service. The term "femtocell" denotes a small cell coverage area established by a compact base station which accesses a mobile communication core network via a broadband network. Typically, the compact base station is installed indoors, such as in an office or a house. The compact base station, which is a low-power output base station installed by a user, may be referred to as a micro base station, a self-configurable base station, an indoor base station, a home base station, or a femto base station. Hereinafter, the compact base station is referred to as the femto base station. The femto base station may distribute radio resources between the user equipment and a macro base station to the femtocells so that the user equipment may reliably send and receive high-speed data with low cost and the macro base station may distribute the excessive radio resources focused on a particular user equipment, through the femto base station.

The femto base station works with the macro base station, and the user equipment should be serviced so as to be able to be handed over between the femto base station and the macro base station. That is, the user equipment should be provided with an improved service that allows for a handing over between the macro base station and the femto base station according to the radio condition.

The service coverage area corresponding to one macrocell may include a large number of service coverage areas corresponding the femtocells, such as thousands of femtocells. A Physical Cell ID (PCID), which is one ID used for identifying the femtocells, may be duplicated within the macrocell. Hence, it is difficult for the macrocell to identify the overlapping femtocells merely with the PCID of a neighbor cell which is reported to the macrocell by the user equipment using a measurement report message. This is the important consideration when only the user equipment that is allowed to access the femtocell is handed over to the corresponding femtocell. Herein, the femtocells are divided into cells allowing the access of every user equipment and cells (hereafter, referred to as Closed Subscriber Group (CSG) cells) allowing the access of only the allowed user equipment.

To address this problem, mobile communication standardization groups such as $3^{rd}$ Generation Partnership Project (3GPP) are discussing an approach for supporting the mobility of the user equipment merely with the PCID and an approach for supporting the mobility of the user equipment with a Global Cell ID (GCID) which is a unique cell ID for identifying the femtocell, together with the PCID. However, the approach for supporting the mobility solely with the PCID faces realistic difficulties. The approach for supporting the mobility using the GCID together with the PCID is under discussion.

According to a conventional method, the user equipment reports the GCID together with the PCID to the macrocell, and the macrocell supports the mobility of the user equipment using those IDs. The conventional method is explained in more detail below.

First, the user equipment receives a Primary Synchronization Signal (PSS) and a Secondary Synchronization Signal (SSS) from its neighbor cell and thus obtains the PCID of the corresponding neighbor cell. However, since it is hard to identify the femtocell merely with the PCID, the user equipment receives a Master Information Block (MIB) and a System Information Block (SIB) from the neighbor cell and thereby obtains a General Cell ID (GCID) which is the unique cell ID of the corresponding neighbor cell. Next, the user equipment sends a measurement report message including the obtained PCID and GCID of the neighbor cells, to its serving macro base station. Based on the measurement report message, the serving macro base station determines whether the user equipment may access the corresponding neighbor cell. According to the determination, the serving macro base station may command the user equipment to hand over to the corresponding neighbor cell. Alternatively, the user equipment determines whether the corresponding neighbor cell is the accessible CSG cell by comparing a list of its accessible CSG cells (i.e., the allowed CSG list), which is managed by itself, with the obtained GCID. When determining the access, the user equipment may send the measurement report message including the obtained PCID and GCID of the neighbor cell, to the serving macro base station. Based on the measurement report message, the serving macro base station may command the user equipment to hand over to the corresponding neighbor cell.

As such, as the PCID is redundant and the user equipment needs to obtain the GCID of the neighbor cell, the measurement time to acquire the PCID and the GCID is lengthened and thus the performance of the user equipment is degraded. In particular, when there are a great number of femtocells in the area, the user equipment iteratively receives the MIB and the SIB of each femtocell. As a result, the performance degradation of the user equipment may be aggravated.

In addition, as the user equipment or the macro base station determines whether the neighbor cell is the accessible femtocell of the user equipment, the performance of the user equipment is degraded. In particular, when there are a great number of femtocells in the area, the user equipment or the macro base station needs to continually determine whether the neighbor cell is an accessible femtocell of the user equipment. Provided that the time of about 20 ms is required for each neighbor cell, the performance degradation of the user equipment may be worsened.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for measuring a signal from a femto Base Station (BS) of a User Equipment (UE) registered to the femto BS in a mobile communication system.

Another aspect of the present invention is to provide an apparatus and a method for a femto BS to send a paging message informing a Closed Subscriber Group (CSG) UE of the existence of the femto BS using a paging frame of the CSG UE over the same Frequency Assignment (FA) as a macro BS at a time point when the macro BS does not use the paging frame, when the CSG UE belonging to an allowed CSG list of the femto BS is in the connected mode within a service coverage area of the macro BS in a mobile communication system.

Yet another aspect of the present invention is to provide an apparatus and a method for an CSG UE to measure a signal from a femto BS based on measurement information obtained from a paging message only for the femto BS from which the paging message is received and to report the measurement to a macro BS, without measuring signals from a plurality of other femto BSs even when the femto BSs reside near the CSG UE, and for the macro BS to determine whether to hand over the CSG UE based on a report in a mobile communication system.

Still another aspect of the present invention is to provide an apparatus and a method for a femto BS to end system information transmission such as paging message, Primary Synchronization Signal (PSS), Secondary Synchronization Signal (SSS), Master Information Block (MIB), and System Information Block (SIB) when an CSG UE completes handover to the femto BS, hands over to another macro BS, or enters an idle mode, thereby preventing unnecessary power consumption and radio resource interference when there are no more UEs accessible to a femto BS in a mobile communication system.

According to one aspect of the present invention, an operating method of a femto BS for measuring a signal from the femto BS of a UE registered to the femto BS in a mobile communication system where the femto BS and a macro BS coexist is provided. The method includes, when the UE registered to the femto BS is located in a service coverage area of the macro BS, generating a paging message informing of the existence of the femto BS, and sending the generated paging message to the UE. The UE measures the signal from the femto BS based on the paging message, generates a measurement report message including a measurement result, and sends the generated measurement report message to the macro BS.

According to another aspect of the present invention, an operating method of a UE for measuring a signal from a femto BS of the UE registered to the femto BS in a mobile communication system where the femto BS and a macro BS coexist is provided. The method includes receiving a paging message informing of the existence of a femto BS from the registered femto BS which is located in a service coverage area of a macro BS, measuring the signal of the femto BS based on the received paging message, and generating and sending a measurement report message including a measurement result to the macro BS.

According to yet another aspect of the present invention, an apparatus of a femto BS for measuring a signal from the femto BS of a UE registered to the femto BS in a mobile communication system where the femto BS and a macro BS coexist is provided. The apparatus includes a message generator for, when the UE registered to the femto BS is located in a service coverage area of the macro BS, generating a paging message informing of the existence of the femto BS, and a transmission modem for sending the generated paging message to the UE. The UE measures the signal from the femto BS based on the paging message, generates a measurement report message including a measurement result, and sends the generated measurement report message to the macro BS.

According to still another aspect of the present invention, an apparatus of a UE for measuring a signal from a femto BS of the UE registered to the femto BS in a mobile communication system where the femto BS and a macro BS coexist is provided. The apparatus includes a reception modem for receiving a paging message informing of the existence of the femto BS from the registered femto BS which is located in a service coverage area of a macro BS, a handover processor for measuring the signal from the femto BS based on the received paging message, a message generator for generating a measurement report message including a measurement result, and a transmission modem for sending the generated measurement report message to the macro BS.

Exemplary embodiments of the present invention provide a method for the femto BS to send the paging message informing the CSG UE of the existence of the femto BS using the paging frame of the CSG UE over the same FA used by the macro BS at the time when the macro BS does not use the paging frame, when the CSG UE belonging to the allowed CSG list of the femto BS is in the connected mode within the service coverage area of the macro BS in the mobile communication system. Also, exemplary embodiments the present invention provide a method for the CSG UE to measure a signal from the femto BS based on the measurement information obtained from the paging message only for the femto BS from which the paging message is received and to report a result of the measurement to a macro BS, without measuring signals from a plurality of femto BSs even when the other femto BSs reside near the CSG UE, and for the macro BS to determine whether to hand over the CSG UE based on the report in a mobile communication system. Therefore, since the CSG UE does not need to measure the signal from a femto BS the paging message is not received, performance degradation may be diminished. Since the paging messages from the macro BS and the femto BS are delivered to the CSG UE through the same paging frame, the CSG UE does not need separate operations to receive the paging message from the femto BS.

When the CSG UE completes the handover to the femto BS, hands over to another macro BS, or enters the idle mode, the femto BS ends the system information transmission such as paging message, PSS, SSS, MIB, and SIB. Thus, it is possible to prevent unnecessary power consumption and to mitigate the radio resource interference when there are no more UEs that may access the femto BS.

Moreover, when the paging message from the macro BS and the paging message from the femto BS overlap, the femto BS sends the paging message by changing its paging message to the paging message transmitted by the macro BS, or by adding its measurement information to the paging message originated from the macro. Thus, the interference between the macro BS and the femto BS may be minimized.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a method for measuring a signal from a femto Base Station (BS) of a User Equipment (UE) registered to the femto BS in a mobile communication system.

Hereinafter, exemplary embodiments of the present invention are explained in the context of a Long Term Evolution (LTE) system for convenience in description. Note that the present invention is equally applicable to other mobile communication systems including a Wideband Code Division Multiple Access (WCDMA) system and an International Mobile Telecommunication (IMT) 2000 system.

A femtocell accessible by only an allowed UE is referred to as a Closed Subscriber Group (CSG) cell, a UE registered to the CSG cell and allowed to access the CSG cell is referred to as a CSG UE, and a BS accessible by only the CSG UE is referred to as a CSG BS.

Figure 1:
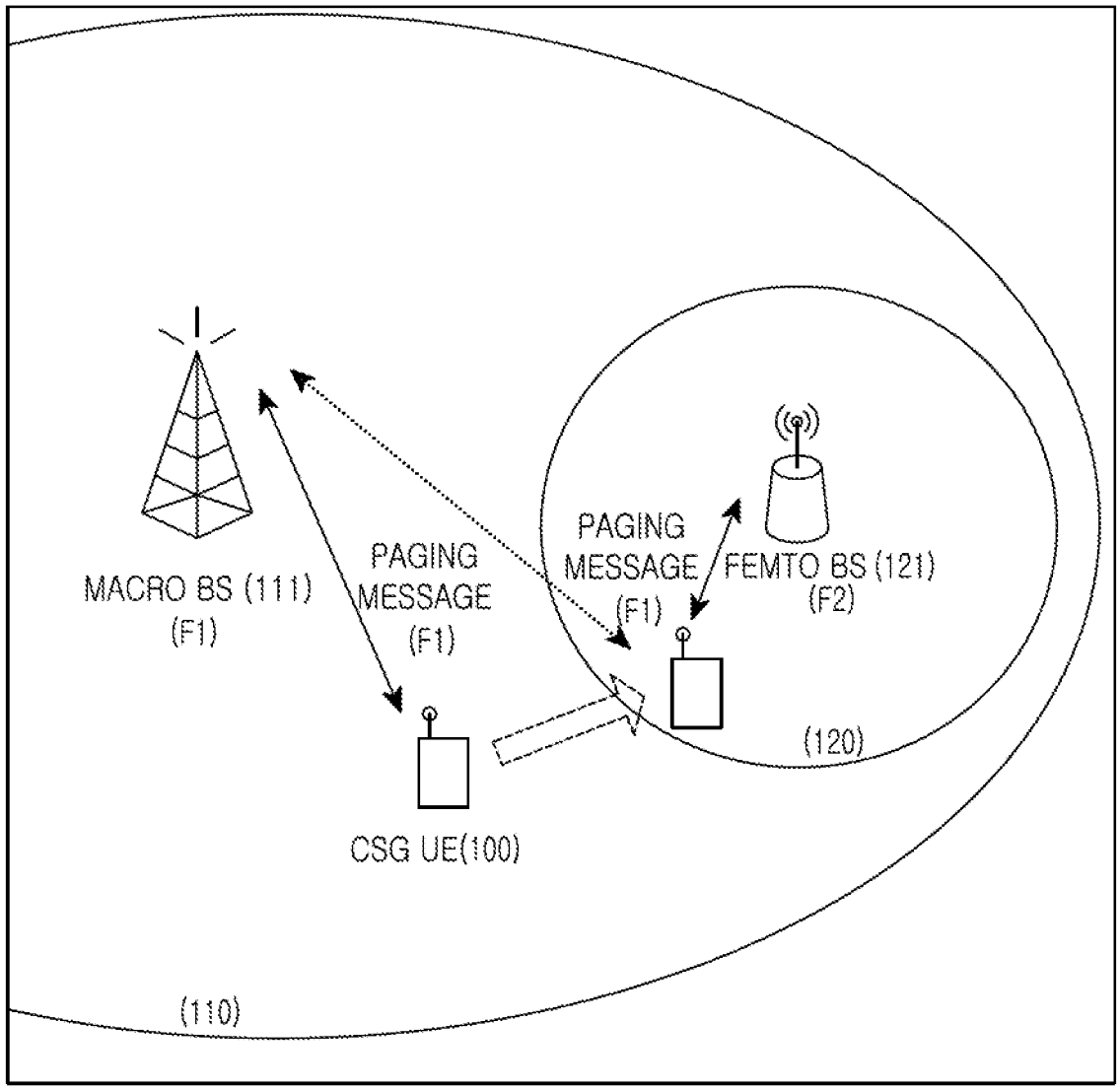
FIG. 1 illustrates a method of a femtocell in a macrocell for sending a paging message over the same Frequency Assignment (FA) as the macrocell when a Closed Subscriber Group (CSG) user equipment enters the macrocell in an environment where the macrocell and the femtocell coexist in a mobile communication system according to an exemplary embodiment of the present invention.

FIG. 1 illustrates a method of a femtocell in a macrocell for sending a paging message over the same Frequency Assignment (FA) as the macrocell when a CSG UE enters the macrocell in an environment where the macrocell and the femtocell coexist in a mobile communication system according to an exemplary embodiment of the present invention.

Referring to FIG. 1, the macro BS 111 services a large area (i.e., the macrocell) 110 including a service coverage area (i.e., the femtocell) 120 of the femto BS 121, and provides service to the accessed UE. In addition to the typical functions, the macro BS 111 identifies an IDentifier (ID) of the UE in the connected mode that is located in its service coverage area, and determines whether the identified UE is a CSG UE 100 belonging to the allowed CSG list of the femto BS 121 managed by itself. When the UE is the CSG UE 100 belonging to the allowed CSG list of the femto BS 121, the macro BS 111 notifies the femto BS 121 of the presence of the CSG UE 100. The macro BS 111 notifies the femto BS 121 of when the macro BS 111 uses a paging frame, and notifies the femto BS 121 that the paging frame allocated to the CSG UE 100 is not allocated to another UE. Herein, the communication between the macro BS 111 and the femto BS 121 may be carried out via a backhaul connection path (i.e., X2 interface).

The femto BS 121 may be classified as a BS that is accessible by any UE or a CSG BS that is only accessible by allowed UEs that are registered to itself (i.e., the CSG UE 100). Hereafter, the femto BS 121 represents a CSG BS, and the CSG BS 121 services the accessed CSG UE 100. In addition to the typical functions, when the macro BS 111 informs the femto BS 121 of the presence of the CSG UE 100 that belongs to the allowed CSG list of the femto BS 121, which is in the connected mode and located within the service coverage area of the macro BS 111, the femto BS 121 synchronizes the paging frame with the macro BS 111 and then generates a paging message including its measurement information. Next, the femto BS 121 sends the generated paging message to the CSG UE 100 using the paging frame of the CSG UE 100 over the same FA (e.g., f1) used by the macro BS 111 at the time when the macro BS 111 does not use the paging frame. The femto BS 121 may send at least one of a Primary Synchronization Signal (PSS), a Secondary Synchronization Signal (SSS), a Master Information Block (MIB), and a System Information Block (SIB) to the CSG UE 100 over its FA (e.g., f2). Herein, the paging message is generated only for the CSG UE 100. Accordingly, even when other UEs receive the paging message, the other UEs discard the paging message because an International Mobile Station Identity (IMSI) included in the paging message does not match their own IMSI. When there is a plurality of CSG UEs that may access the femto BS 121 at the same time, the femto BS 121 may send the paging message to each of those CSG UEs. Herein, when the CSG UE 100 that may access the femto BS 121 does not camp on the service coverage area of the macro BS 111 or when that CSG UE 100 is no longer in the connected mode despite being located within the service coverage area, it is assumed that the femto BS 121 stays in a standby mode and does not send any signal. When the CSG UE 100 completely hands over to the femto BS 121, hands over to another macro BS, or enters an idle mode, the femto BS 121 may complete the system information transmission such as the paging message, the PSS, the SSS, the MIB, and the SIB, and enter the standby mode after returning its allocated resource so that the resource allocated to itself, such as a Physical Cell IDentifier (PCID), may be reused by other femto BSs in the service coverage area of the macro BS 111.

The UE may be classified as the CSG UE 100 or a general UE. In addition, when operating in the connected mode within the service coverage area of the macro BS 111 and receiving the service from the macro BS 111, the CSG UE 100 receives the paging frames from the macro BS 111 and the femto BS 121 at different times over the same FA (e.g., f1) through its paging frame. Next, the CSG UE 100 obtains the measurement information of the femto BS 121 from the received paging frame of the femto BS 121 and uses the obtained information to measure a signal from the femto BS 121. That is, the CSG UE 100 acquires the PCID of the femto BS 121 by decoding the PSS and the SSS received from the femto BS 121, and acquires the Global Cell ID (GCID) of the femto BS 121 by decoding the MIB and the SIB received from the femto BS 121. Next, the CSG UE 100 sends a measurement report message including the acquired PCID and GCID of the femto BS 121, to the macro BS 111. Hence, the macro BS 111 may determine whether or not to hand over the CSG UE 100. In more detail, even when there are a plurality of the femto BSs near the CSG UE 100, the CSG UE 100 does not measure signals from the other femto BSs. Instead, the CSG UE 100 only measures a signal from the femto BS 121 which sends the paging message. The CSG UE 100 measures the signal from the femto BS 121 based on the measurement information obtained from the paging message of the femto BS 121.

Although it is not illustrated, a Mobility Management Entity (MME) may communicate with the macro BS 111 and the femto BS 121 through an S1 interface, and manage the mobility of the UE.

Figure 2:
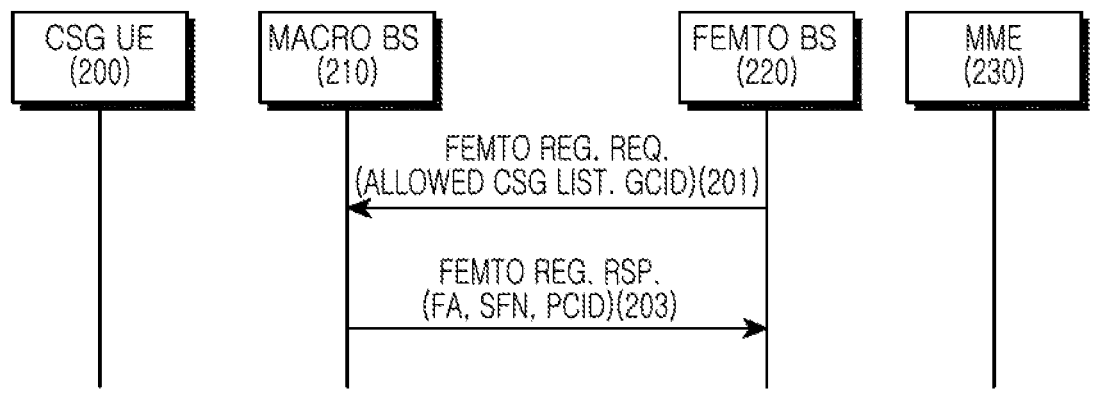
FIG. 2 illustrates a method for registering a femto base station to a macro base station in a mobile communication system according to an exemplary embodiment of the present invention.

FIG. 2 illustrates a method for registering a femto BS to a macro BS in a mobile communication system according to an exemplary embodiment of the present invention.

When a new femto BS 220 is installed and turned on in the service coverage area of a macro BS 210, the femto BS 220 scans for and detects the macro BS 210 in its camping service coverage area at the current location using neighbor cell environment through a Self Optimization Network (SON) procedure. Next, the femto BS 220 generates and sends a femto register request message to the detected macro BS 210 in step 201. Herein, the register request message includes the allowed CSG list indicating the CSG UEs that may access the femto BS 220, and the GCID of the femto BS itself. In some implementations, the macro BS 210 may receive the allowed CSG list of the femto BS 220 from the MME 230.

The macro BS 210 receives the register request message and obtains the allowed CSG list and the GCID of the femto BS 220. The macro BS 210 allocates the PCID to the femto BS 220, maps and stores the allocated PCID and the obtained allowed CSG list and GCID to a memory. Next, the macro BS 210 generates a femto register response message including its FA, System Frame Number (SFN), and the allocated PCID, and sends the generated message to the femto BS 220 in step 203.

The femto BS 220 receives the register response message and obtains its allocated PCID and the FA and the SFN of the macro BS 210, and maintains the same frame boundary as the macro BS 210 using the received FA and SFN of the macro BS 210. That is, the femto BS 220 synchronizes the frame with the macro BS 210. Thus, the femto BS 220 completes its registration to the macro BS 210.

Although it is not illustrated, using the obtained allowed CSG list, the macro BS 210 may examine whether the CSG UE 200 may access the femto BS 220 when it is in the connected mode within the service coverage area of the macro BS 210. When determining that the CSG UE 200 may access the femto BS 220 when it is in the connected mode within the service coverage area, the macro BS 210 may generate and send an accessible UE HandOver (HO) notification message to the femto BS 220. Herein, the accessible UE HO notification message may include the FA and the SFN of the macro BS 210, the PCID of the femto BS 220, and the UE ID of the CSG UE 200. When there is no CSG UE 200 that may access the femto BS 220 in the service coverage area or when the CSG UE 200 is not in the connected mode despite being within the service coverage area, the macro BS 210 may inform of an absence of a CSG UE 200 that may access the femto BS 220 by not sending the accessible UE HO notification message or generating and sending the accessible UE HO notification message including no UE ID of a CSG UE 200 that may access the femto BS 220.

Based on the accessible UE HO notification message, when there is no CSG UE 200 that may access the femto BS 220 in the service coverage area or when the CSG UE 200 is not in the connected mode despite being in the service coverage area, the femto BS 220 may enter the standby mode. In so doing, the femto BS 220 may return its allocated resources so that its allocated resource, such as the PCID, may be reused by other femto BSs in the service coverage area of the macro BS 210. In contrast, upon determining based on the accessible UE HO notification message that the CSG UE 200 may access the femto BS 220 and is in the connected mode within the service coverage area of the macro BS 210, the femto BS 220 may send the paging message to the corresponding CSG UE 200 over the same FA used by the macro BS 210 in order to inform of the existence of the femtocell.

Figure 3:
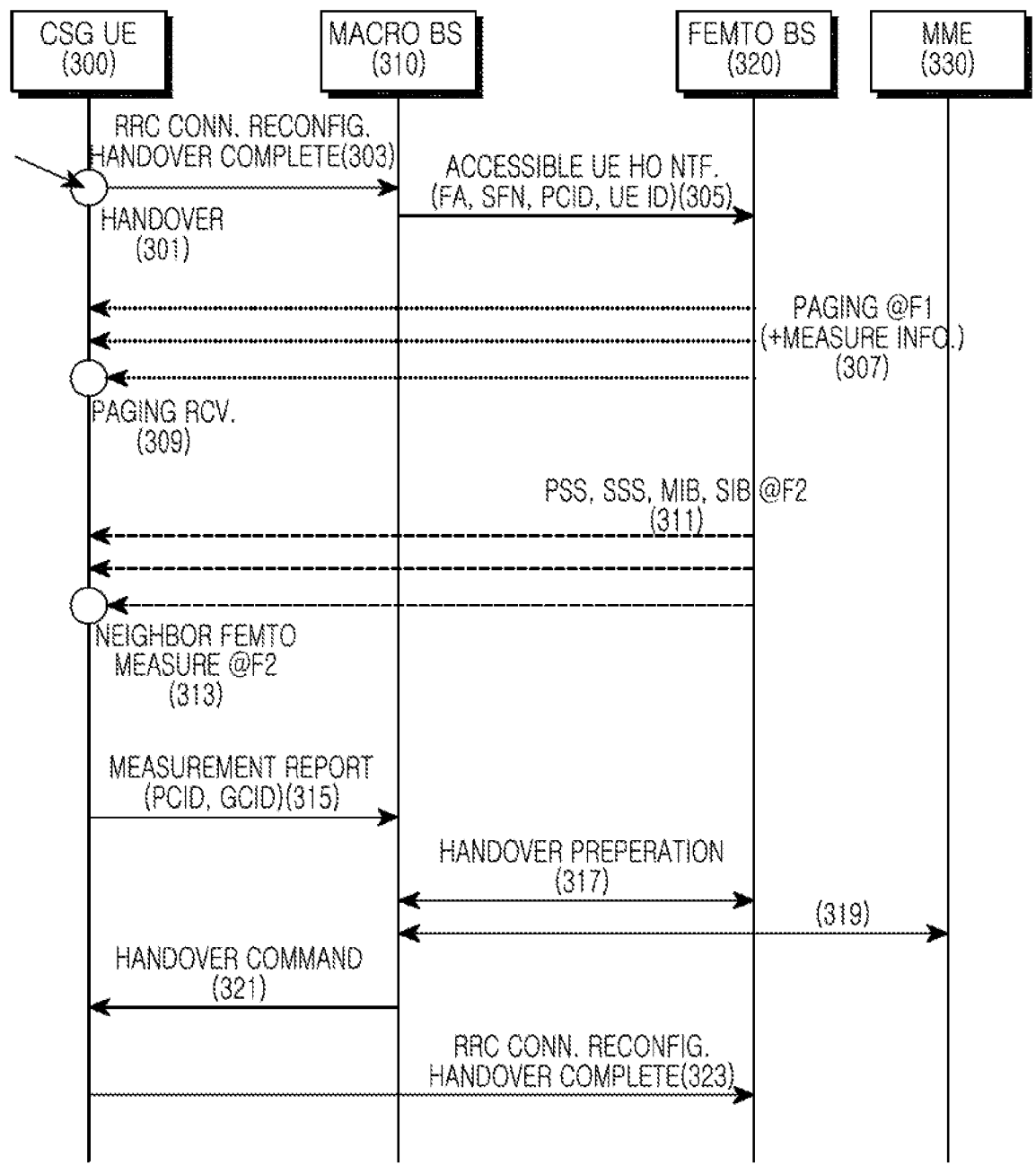
FIG. 3 illustrates a method of a femto base station for sending a paging message to a CSG user equipment using the same FA as a macro base station in a mobile communication system according to an exemplary embodiment of the present invention.

FIG. 3 illustrates a method of a femto BS for sending a paging message to a CSG UE using the same FA as a macro BS in a mobile communication system according to an exemplary embodiment of the present invention.

The CSG UE 300 enters the service coverage area of the macro BS 310 and performs a handover in step 301. The CSG UE 300 informs of the handover completion by sending an RRC connection reconfiguration message to the macro BS 310 in step 303.

As such, when the UE enters the service coverage area and performs a handover or when the idle UE in the service coverage area transitions to the connected mode, the macro BS 310 may determine whether the corresponding UE is a CSG UE 300 that may access the femto BS 320 by comparing the UE ID of the corresponding UE with the allowed CSG list of the femto BS managed by itself. The allowed CSG list per femto BS is stored in memory. The macro BS 310 may extract the allowed CSG list per femto BS from the memory for the comparison.

Thus, using the UE ID of the CSG UE 300 entering the service coverage area and the allowed CSG list of its managed femto BS 320, the macro BS 310 determines whether the CSG UE 300 is the CSG UE 300 that may access the femto BS 320. When determining that the CSG UE 300 is the CSG UE 300 that may access to the femto BS 320, the macro BS 310 generates and sends an accessible UE HO notification message to the femto BS 320 in step 305. Herein, the accessible UE HO notification message is a message to inform of the CSG UE 300 that may access the femto BS 320 in the service coverage area of the macro BS 310, and may include the FA and the SFN of the macro BS 310, the PCID of the femto BS 320, and the UE ID of the CSG UE 300. In addition, the accessible UE HO notification message may further include information such as a use time of the paging frame.

Upon receiving the accessible UE HO notification message, the femto BS 320 obtains the FA and the SFN of the macro BS 310, the PCID of the femto BS 320, the UE ID of the CSG UE 300, and information such as the use time of the paging frame, and synchronizes the paging frame using the acquired FA and SFN of the macro BS 310. Next, the femto BS 320 generates a paging message to inform of the existence of the femtocell. Based on the acquired information, the femto BS 320 sends the generated paging message to the CSG UE 300 over the same FA used by the macro BS 310 using the paging frame of the CSG UE 300 at a time when the paging frame is not used by the macro BS 310 in step 307. In so doing, the femto BS 320 may add an optional field to the paging message. The optional field may include the FA and the PCID of the femto BS 320, if necessary, the GCID, and the measurement information such as femto BS name.

The CSG UE 300 may move into the service coverage area of the femto BS 320 while being serviced by the macro BS 310 in the service coverage area of the macro BS 310. Hence, the CSG UE 300 may receive the paging message from the femto BS 320 in step 309. Herein, the paging message from the femto BS 320 is received over the same FA as the paging message from the macro BS 310. Accordingly, the CSG UE 300 does not perform corresponding separate operations. Yet, the CSG UE 300 may confirm that there is an accessible femtocell in the vicinity based on the received paging message, acquire the measurement information including the FA, the PCID, the GCID of the femto BS 320, and the femto BS name by decoding the paging message, and utilize the acquired measurement information to measure a signal from the neighbor femto BS 320.

Herein, to avoid a collision between the paging message transmitted by the femto BS 320 and the paging message transmitted by the macro BS 310 according to the trigger of the MME 330, the femto BS 320 may receive the information of the use time of the paging frame from the macro BS 310 through the accessible UE HO notification message and send its own paging message at the time when the paging frame is not used by the macro BS 310. Also, to avoid the allocation of the paging frame of the CSG UE 2300 to other UE and to lead the CSG UE 300 to access the femto BS 320, the femto BS 320 may request the macro BS 310 to restrict the use of other UEs with respect to the resource, such as paging frame, allocated to the CSG UE 300.

Meanwhile, to prevent mutual interference, the macro BS 310 and the femto BS 320 are serviced over different FAs in general cases except for the transmission of the paging message. Hence, the femto BS 320 sending the paging message transmits the PSS, the SSS, the MIB, and the SIB to the CSG UE 300 using its own FA in step 311.

Using the measurement information obtained by decoding the paging message, the CSG UE 300 measures a signal from the femto BS 320 in step 313. More specifically, the CSG UE 300 obtains the PCID of the femto BS 320 by decoding the PSS and the SSS received from the femto BS 320, and obtains the GCID of the femto BS 320 by decoding the MIB and the SIB received from the femto BS 320. Next, the CSG UE 300 generates and sends the measurement report message including the obtained PCID and GCID of the femto BS 320, to the macro BS 320 in step 315. As such, the CSG UE 300 scans the corresponding femtocell using the measurement information of the paging message only when receiving the paging message from the femto BS 320 to which the CSG UE 300 may access, without having to measure signals from every femto BS defined in a particular PCID. Thus, unnecessary UE operations may be reduced.

The macro BS 310 determines whether to hand over the CSG UE 300 based on the measurement report message, generates a handover preparation message according to the determination, and sends the generated message to the femto BS 320 and the MME 330 in steps 317 and 319. The macro BS 310 generates a handover command message according to the determination, sends the generated message to the CSG UE 300, and thereby instructs the CSG UE 300 to hand over to the femto BS 320 in step 321. The CSG UE 300 hands over to the femto BS 320 and informs the femto BS 320 of the handover completion by sending an RRC connection reconfiguration message to the femto BS 320 in step 323.

Figure 4:
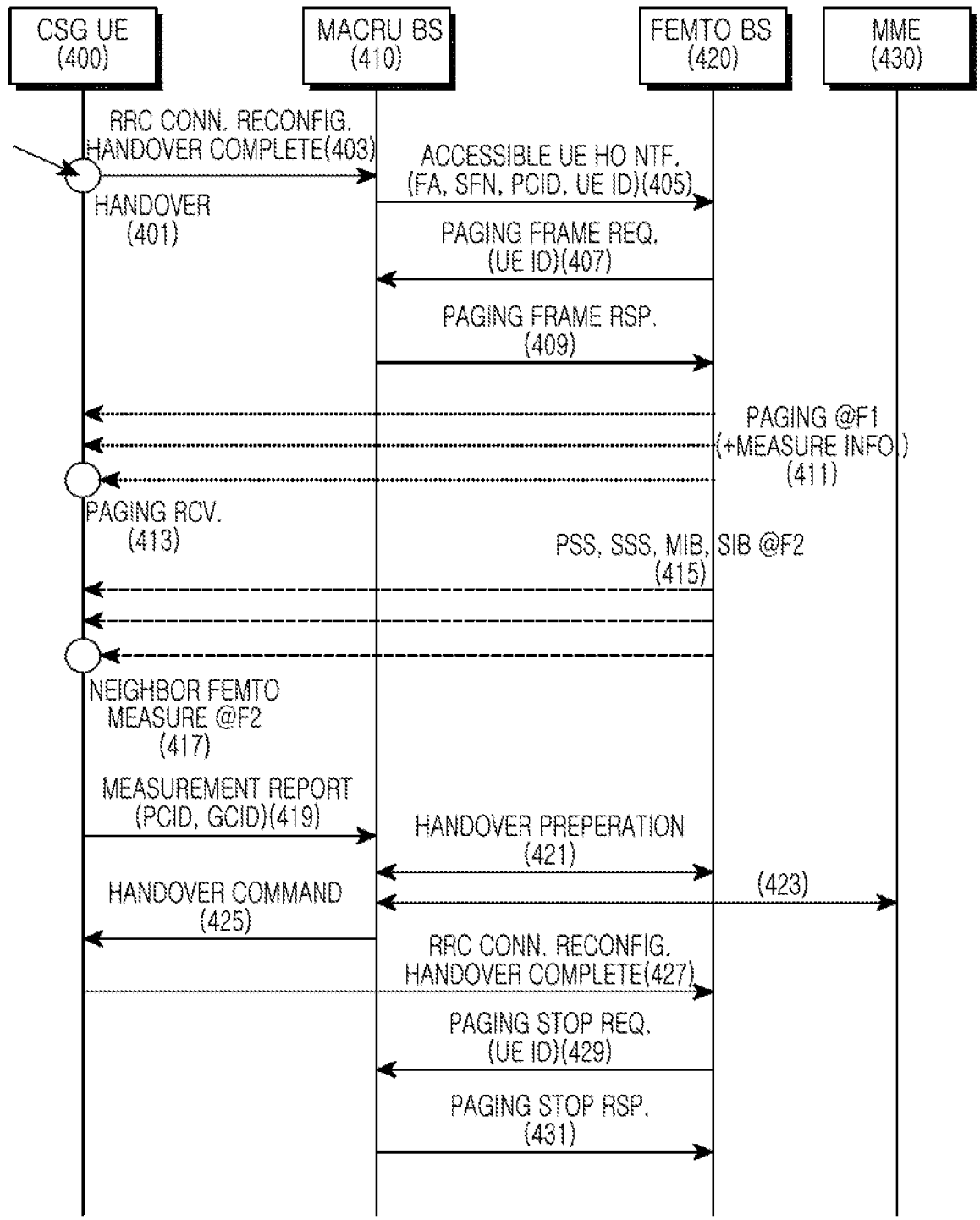
FIG. 4 illustrates another method of a femto base station for sending a paging message to a CSG user equipment using the same FA as a macro base station in a mobile communication system according to an exemplary embodiment of the present invention.

FIG. 4 illustrates a method of a femto BS for sending a paging message to a CSG UE using the same FA as a macro BS in a mobile communication system according to an exemplary embodiment of the present invention.

It is noted that FIG. 4 is substantially the same as FIG. 3. For example, the steps 301 through 305 of FIG. 3 are identical to steps 401 through 405 of FIG. 4 and the steps 307 through 323 of FIG. 3 are identical to steps 411 through 427 of FIG. 4. Accordingly, descriptions thereof will be omitted for conciseness. However, whereas the macro BS may send information such as the use time of the paging frame to the femto BS using the accessible UE HO notification message in FIG. 3, the femto BS may request to allocate the paging frame by sending a separate message to the macro BS in FIG. 4.

That is, the femto BS 420 receiving the accessible UE HO notification message from the macro BS 410 recognizes the existence of the CSG UE 400 that may access itself and is located in the service coverage area of the macro BS 410, generates and sends a paging frame request message relating to the UE ID of the CSG UE 400 to the macro BS 410 in order to send the paging message to the CSG UE 400 using the paging frame of the CSG UE 400 in step 407. Herein, the paging frame request message is a message to request to allocate the paging frame allocated to the CSG UE 400.

Upon receiving the paging frame request message, the macro BS 410 allocates the unused part of the paging frame to the femto BS 420, generates and sends a paging frame response message including the allocation information; that is, including the information relating to the time when the macro BS 410 uses the paging frame, to the femto BS 420 in step 409. Thus, the femto BS 420 may send its paging message at the time when the macro BS 410 does not use the paging frame.

In FIG. 4, the femto BS may request to release the paging frame by sending a separate message to the macro BS.

More specifically, when the CSG UE 400 completely hands over to the femto BS 420, hands over to another macro BS, or enters the idle mode, the femto BS 420 generates and sends a paging stop request message to the macro BS 410 in step 429. The macro BS 410 releases the paging frame allocated to the femto BS 420 according to the reception of the paging stop request message, generates and sends a paging stop response message to the femto BS 420 in step 431. This is to stop the system information transmission such as paging message, PSS, SSS, MIB, and SIB of the femto BS 420, and thus to prevent the unnecessary power consumption and the radio resource interference when there are no more accessible UEs.

Figure 5:
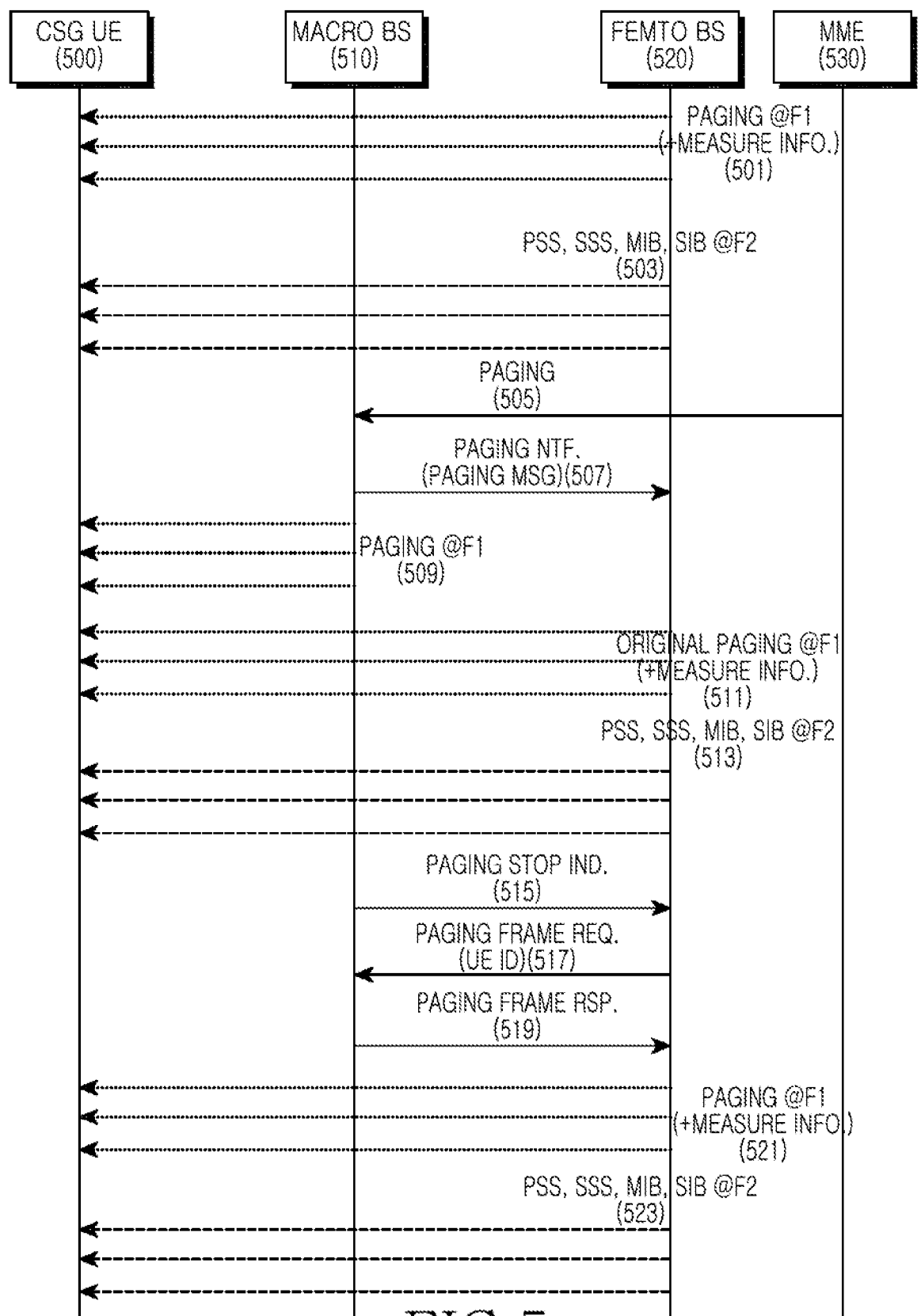
FIG. 5 illustrates a method of a macro base station for sending a paging message to a CSG user equipment while a femto base station sends the paging message to the CSG user equipment using the same FA as the macro base station in a mobile communication system according to an exemplary embodiment of the present invention.

FIG. 5 illustrates a method of a macro BS for sending a paging message to a CSG UE while a femto BS sends the paging message to the CSG UE using the same FA as the macro BS in a mobile communication system according to an exemplary embodiment of the present invention.

Referring to FIG. 5, the femto BS 520 generates the paging message to inform the accessible CSG UE 500 of the femtocell, and sends the generated paging message to the CSG UE 500 using the paging frame of the CSG UE 500 over the same FA used by the macro BS 510 at the time when the macro BS 510 does not use the paging frame in step 501. In so doing, the femto BS 520 may add an optional field to the paging message, and the optional field may include the FA and the PCID of the femto BS 520, if necessary, the GCID, and measurement information such as femto BS name. Next, the femto BS 520 transmits the PSS, the SSS, the MIB, and the SIB to the CSG UE 500 using its FA in step 503.

Meanwhile, when the MME 530 triggers the transmission of the paging message by sending the paging message to the macro BS 510 in step 505, the macro BS 510 generates a paging notification message including the paging message received from the MME 530 and sends the generated message to the femto BS 520 in step 507. The macro BS 510 forwards the paging message received from the MME 530 to the CSG UE 500 using the paging frame of the CSG UE 500 over its FA in step 509.

Upon receiving the paging notification message, the femto BS 520 forwards the paging message received from the macro BS 510 to the CSG UE 500 using the paging frame of the CSG UE 500 over the same FA used by the macro BS 510 at a time when macro BS 510 does not use the paging frame in step 511. The femto BS 520 may add its measurement information to the paging message received from the macro BS 510 and then forward the paging message to the CSG UE 500. Next, the femto BS 520 sends the PSS, the SSS, the MIB, and the SIB to the CSG UE 500 using its FA in step 513. Since the general service radius of the femto BS 520 is within 10 m and the femto BS 520 and the macro BS 510 have already synchronized the SFN, the interference between the femto BS 520 and the macro BS 510 is minimized and the CSG UE 500 may concurrently receive the paging message from the MME 530 and the paging message from the femto BS 520.

After forwarding the paging message received from the MME 530 to the CSG UE 500, the macro BS 510 sends a paging stop indication message to the femto BS 520 in step 515.

Upon receiving the paging stop indication message, the femto BS 520 generates a paging frame request message for the UE ID of the CSG UE 500 and sends the generated message to the macro BS 510 so as to resend its paging message to the CSG UE 500 using the paging frame of the CSG UE 500 in step 517.

Upon receiving the paging frame request message, the macro BS 510 allocates the unused part of the paging frame to the femto BS 520, generates a paging frame response message including the allocation information; that is, including the information relating to the time when the macro BS 510 uses the paging frame, and sends the generated message to the femto BS 520 in step 519. Thus, the femto BS 520 resends its paging message to the CSG UE 500 using the same FA as the macro BS 510 at the time when the macro BS 510 does not use the paging frame in step 521, and then transmits the PSS, the SSS, the MIB, and the SIB to the CSG UE 500 using its FA in step 523.

Figure 6:
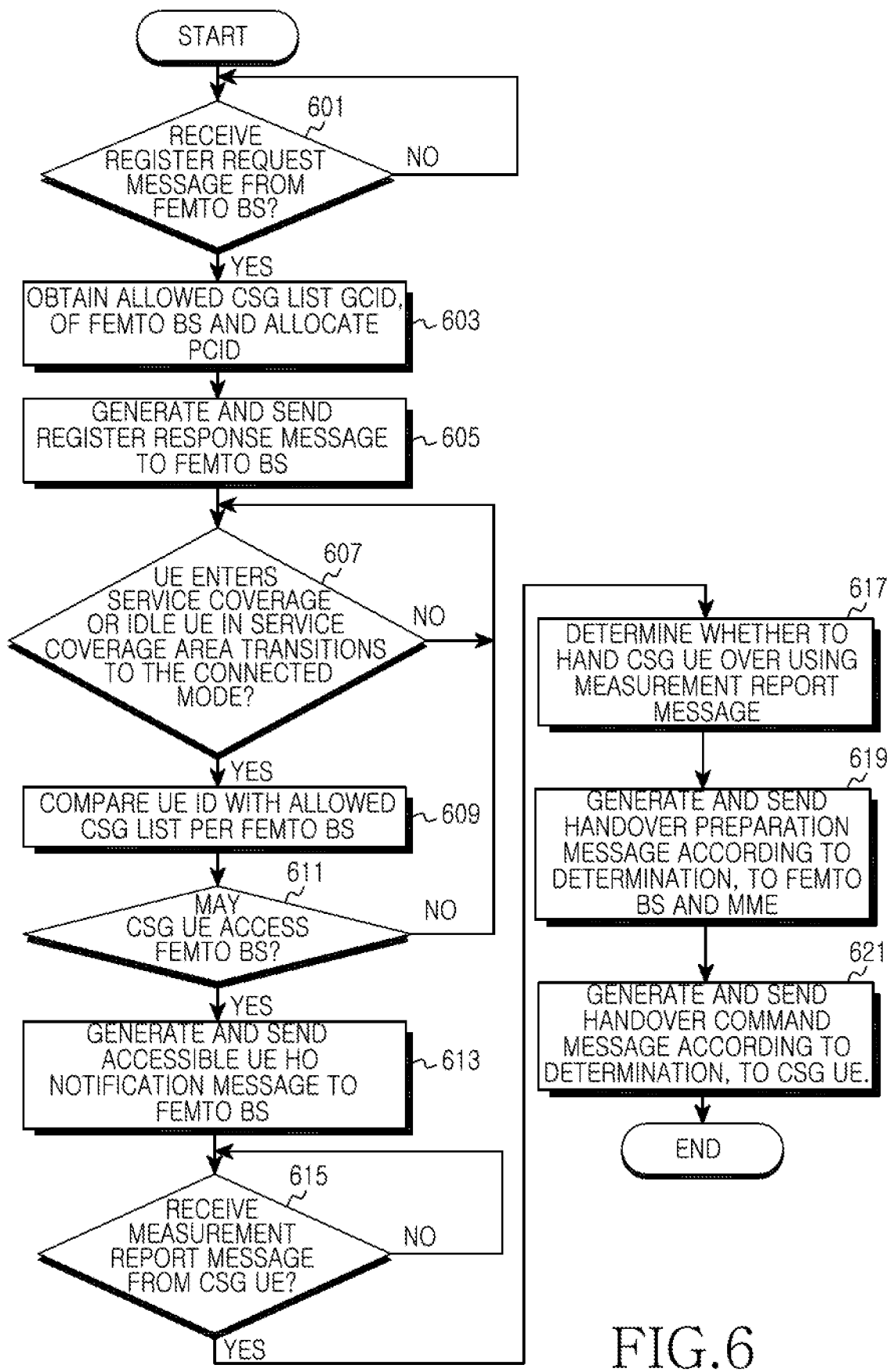
FIG. 6 is a flowchart of operations of a macro base station when a femto base station sends a paging message to a CSG user equipment using the same FA as the macro base station in a mobile communication system according to an exemplary embodiment of the present invention.

FIG. 6 is a flowchart of operations of a macro BS for a femto BS to send a paging message to a CSG UE using the same FA as a macro BS in a mobile communication system according to an exemplary embodiment of the present invention.

Referring to FIG. 6, in step 601, the macro BS determines whether the register request message is received from the femto BS. Herein, the register request message includes the allowed CSG list indicating the CSG UEs that may access the femto BS, and the GCID. In some implementations, the macro BS may receive the allowed CSG list of the femto BS from the MME.

When receiving the register request message from the femto BS in step 601, the macro BS obtains the allowed CSG list and the GCID of the femto BS based on the received register request message, and allocates the PCID to the femto BS in step 603. In so doing, the macro BS may map and store the allocated PCID and the acquired allowed CSG list and GCID in memory.

In step 605, the macro BS generates and sends the register response message to the femto BS. Herein, the register response message includes the FA and the SFN of the macro BS, and the allocated PCID. Hence, the macro BS completes the registration of the femto BS.

In step 607, the macro BS determines whether the UE enters its service coverage area or whether the idle UE in its service coverage area transitions to the connected mode.

When determining that the UE enters its service coverage area or the idle UE located in its service coverage area transitions to the connected mode in step 607, the macro BS compares the UE ID of the corresponding UE with the allowed CSG list managed per femto BS in step 609, and examines whether the UE is a CSG UE that may access the femto BS in step 611.

When determining that the UE is not a CSG UE that may access the femto BS in step 611, the macro BS returns to step 607.

In contrast, when the UE is determined to be a CSG UE that may access the femto BS in step 611, the macro BS generates and sends the accessible UE HO notification message to the femto BS in step 613. Herein, the accessible UE HO notification message is the message to inform of the CSG UE that may access the femto BS in the service coverage area of the macro BS, and may include the FA and the SFN of the macro BS, the PCID of the femto BS, and the UE ID of the CSG UE. In addition, the accessible UE HO notification message may further include information such as a use time of the paging frame.

Alternatively, when the femto BS receiving the accessible UE HO notification message requests to allocate the paging frame by sending a separate message to the macro BS, the macro BS may allocate the unused part of the paging frame to the femto BS, rather than sending the information, such as use time of the paging frame, using the accessible UE HO notification message. That is, the macro BS sending the accessible UE HO notification message to the femto BS examines whether the paging frame request message for the UE ID of the CSG UE is received from the femto BS. Next, upon receiving the paging frame request message, the macro BS allocates the unused part of the paging frame to the femto BS, generates the paging frame response message including the allocation information; that is, including the information of the time when the macro BS uses the paging frame, and sends the generated message to the femto BS. Hence, the femto BS may send its paging message at the time when the macro BS does not use the paging frame.

In step 615, the macro BS determines whether the measurement report message is received from the CSG UE. Herein, the measurement report message includes the PCID and the GCID of the femto BS obtained by the CSG UE through the measurement.

Upon receiving the measurement report message from the CSG UE in step 615, the macro BS determines using the received measurement report message whether to hand over the CSG UE in step 617.

Next, the macro BS generates the handover preparation message according to the determination and sends the generated message to the femto BS and the MME in step 619, and generates and sends to the CSG UE the handover command message according to the determination in step 621. For example, if it is determined that the CSG UE 300 hands over in step 617, the macro BS generates the handover preparation message in step 619. In contrast, if it is determined that the CSG UE 300 does not hand over in step 617, the macro BS finishes this process.

Alternatively, when the femto BS requests to allocate the paging frame by sending a separate message to the macro BS and the macro BS allocates the unused part of the paging frame to the femto BS, the femto BS may request to release the paging frame by sending a separate message to the macro BS. That is, the macro BS determines whether the paging stop request message is received from the femto BS. When the CSG UE completes its handover to the femto BS, hands over to another macro BS, or enters the idle mode, the femto BS may generate and send the paging stop request message to the macro BS. Upon receiving the paging stop request message, the macro BS releases the paging frame allocated to the femto BS, and generates and sends the paging stop response message to the femto BS. Hence, the femto BS may finish the transmission of the paging message.

Next, the macro BS finishes this process.

Figure 7:
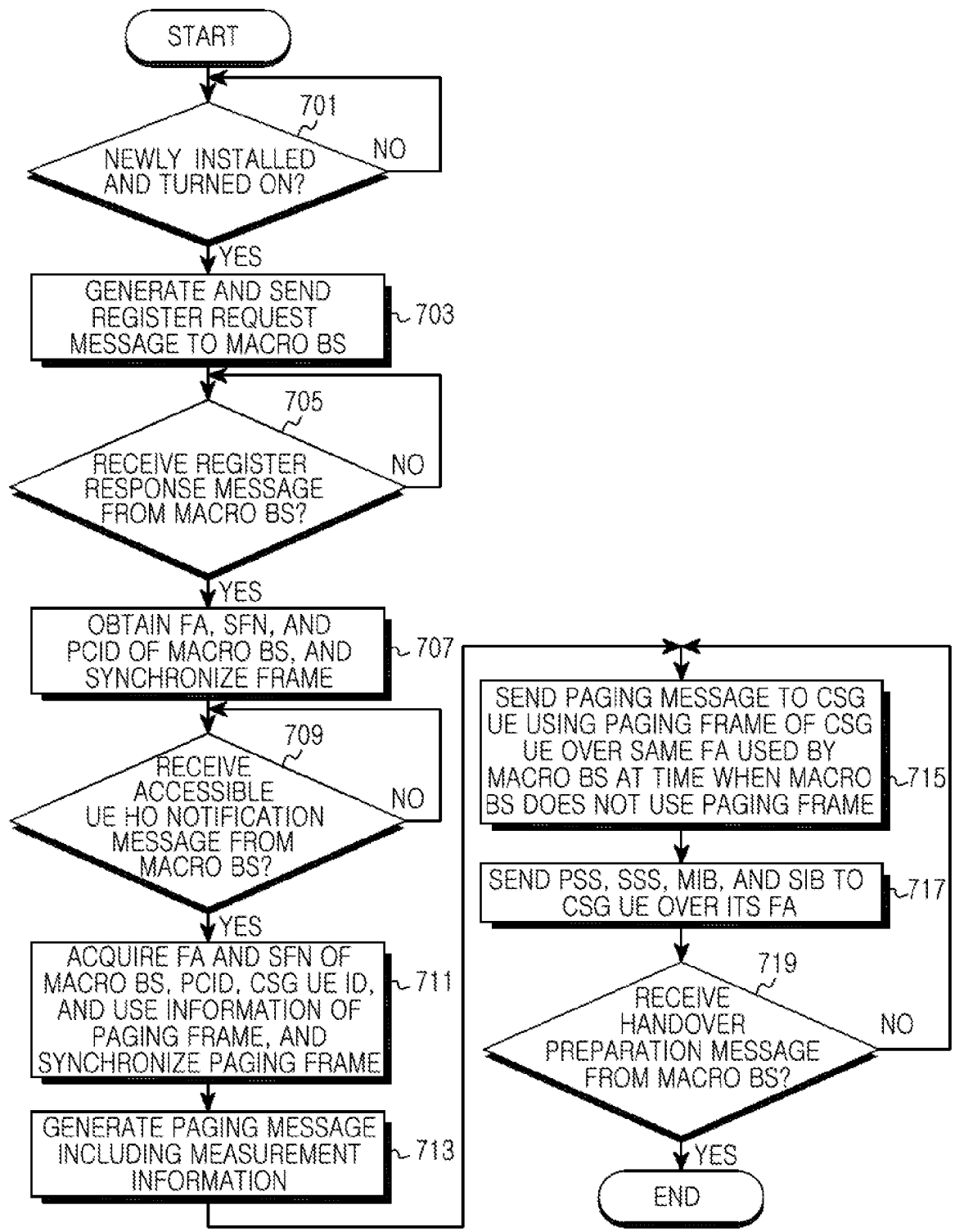
FIG. 7 is a flowchart of operations of a femto base station for sending a paging message to a CSG user equipment using the same FA as a macro base station in a mobile communication system according to an exemplary embodiment of the present invention.

FIG. 7 is a flowchart of operations of a femto BS for sending a paging message to a CSG UE using the same FA as a macro BS in a mobile communication system according to an exemplary embodiment of the present invention.

Referring to FIG. 7, in step 701, the femto BS determines whether it is newly installed and turned on.

When determining if the femto BS is newly installed and the power-on in step 701, the femto BS scans for and, if present, detects a macro BS in its camping service coverage area at its current location using the neighbor cell environment through the SON procedure, generates and sends the register request message to the detected macro BS in step 703. Herein, the register request message includes the allowed CSG list which is the list of the CSG UEs that may access the femto BS, and the GCID.

In step 705, the femto BS determines whether the register response message is received from the macro BS. Herein, the register response message includes the FA and the SFN of the macro BS, and the PCID allocated to the femto BS by the macro BS.

Upon receiving the register response message from the macro BS in step 705, the femto BS obtains the FA and the SFN of the macro BS and the PCID allocated to itself based on the received register response message, and synchronizes the frame with the macro BS using the obtained FA and SFN of the macro BS in step 707. Thus, the femto BS completes the registration to the macro BS.

In step 709, the femto BS determines whether the accessible UE HO notification message is received from the macro BS. Herein, the accessible UE HO notification message is the message to inform of the CSG UE that may access the femto BS in the service coverage area of the macro BS, and may include the FA and the SFN of the macro BS, the PCID of the femto BS, and the UE ID of the CSG UE. In addition, the accessible UE HO notification message may further include information such as a use time of the paging frame.

Alternatively, as the femto BS receiving the accessible UE HO notification message requests to allocate the paging frame by sending a separate message to the macro BS, rather than sending the information such as use time of the paging frame using the accessible UE HO notification message, the macro BS may allocate the unused part of the paging frame to the femto BS. That is, the femto BS receiving the accessible UE HO notification message generates and sends the paging frame request message for the UE ID of the CSG UE, to the macro BS, and determines whether the paging frame response message including the information of the time when the macro BS uses the paging frame is received from the macro BS. When receiving the paging frame response message, the femto BS may send its paging message at the time when the macro BS does not use the paging frame.

Upon receiving the accessible UE HO notification message from the macro BS in step 709, the femto BS acquires the FA and the SFN of the macro BS, the PCID of the femto BS, the ID of the CSG UE, and the use information of the paging frame (e.g., the use information of the paging frame on the time basis) based on the received accessible UE HO notification message, and synchronizes the paging frame using the acquired FA and SFN of the macro BS in step 711.

Next, the femto BS generates the paging message including the measurement information to measure a signal from itself in step 713. Based on the acquired information, the femto BS sends the generated paging message to the CSG UE using the paging frame of the CSG UE over the same FA used by the macro BS at the time when the macro BS does not use the paging frame in step 715. Herein, the measurement information may include the FA and the PCID of the femto BS, if necessary, the GCID, and the femto BS name. In other cases, the measurement information may further include other various information.

In step 717, the femto BS sends the PSS, the SSS, the MIB, and the SIB to the CSG UE over its FA.

In step 719, the femto BS determines whether the handover preparation message is received from the macro BS. When it is determined that the handover preparation message is not received from the macro BS in step 719, the femto BS returns to step 715. In contrast, when it is determined that the handover preparation message is received from the macro BS in step 719, when the CSG UE hands over to another macro BS, or when the CSG UE enters the idle mode, the femto BS finishes this process.

Alternatively, when requesting to allocate the paging frame by sending a separate message to the macro BS, the femto BS may request to release the paging frame by sending a separate message to the macro BS. More specifically, when the CSG UE completes the handover to the femto BS, hands over to another macro BS, or enters the idle mode, the femto BS generates and sends the paging stop request message to the macro BS, and determines whether the paging stop response message is received from the macro BS. When receiving the paging stop response message, the femto BS ends the transmission of the paging message.

Next, the femto BS finishes this process.

Figure 8:
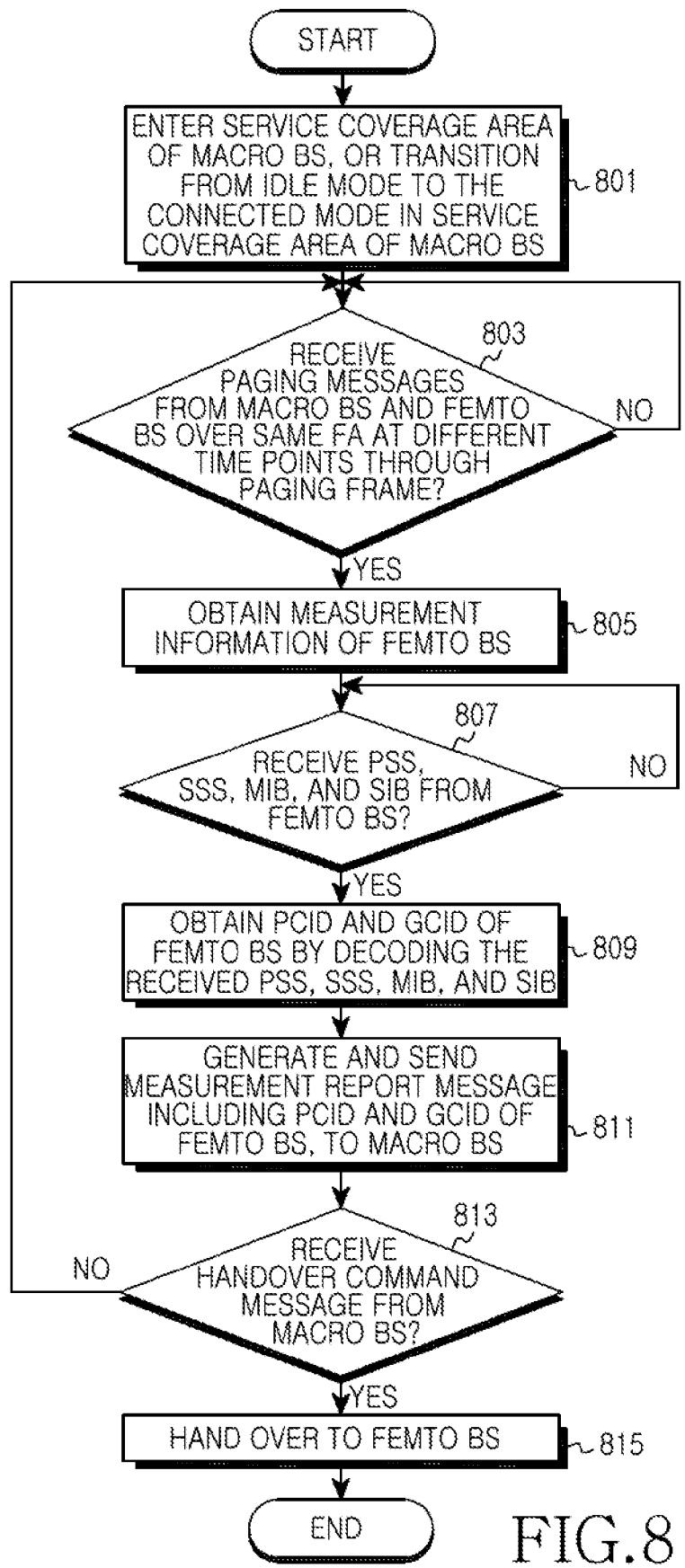
FIG. 8 is a flowchart of operations of a CSG user equipment when a femto base station sends a paging message to the CSG user equipment using the same FA as a macro base station in a mobile communication system according to an exemplary embodiment of the present invention.

FIG. 8 is a flowchart of operations of a CSG UE for a femto BS to send a paging message to the CSG UE using the same FA as a macro BS in a mobile communication system according to an exemplary embodiment of the present invention.

Referring to FIG. 8, in step 801, the CSG UE enters the service coverage area of the macro BS, or transitions from the idle mode to the connected mode in the service coverage area of the macro BS.

In step 803, the CSG UE determines whether the paging messages are received from the macro BS and the femto BS over the same FA at different time points through the paging frame.

When receiving the paging messages from the macro BS and the femto BS at the different time points over the same FA through the paging frame in step 803, the CSG UE obtains the measurement information of the femto BS based on the paging message received from the femto BS in step 805. Herein, the measurement information includes the FA and the PCID of the femto BS, if necessary, the GCID and the femto BS name.

In step 807, the CSG UE determines whether the PSS, the SSS, the MIB, and the SIB are received from the femto BS.

Upon receiving the PSS, the SSS, the MIB, and the SIB from the femto BS in step 807, the CSG UE obtains the PCID of the femto BS by decoding the received PSS and SSS and obtains the GCID of the femto BS by decoding the MIB and the SIB in step 809.

In step 811, the CSG UE generates the measurement report message including the obtained PCID and GCID of the femto BS and sends the generated message to the macro BS.

In step 813, the CSG UE determines whether the handover command message is received from the macro BS.

Upon determining that the handover command message is received from the macro BS in step 813, the CSG UE hands over to the femto BS in step 815. In contrast, if it is determined that the handover command message is not received from the macro BS in step 813, the CSG UE returns to step 803.

Next, the CSG UE finishes this process.

Figure 9:
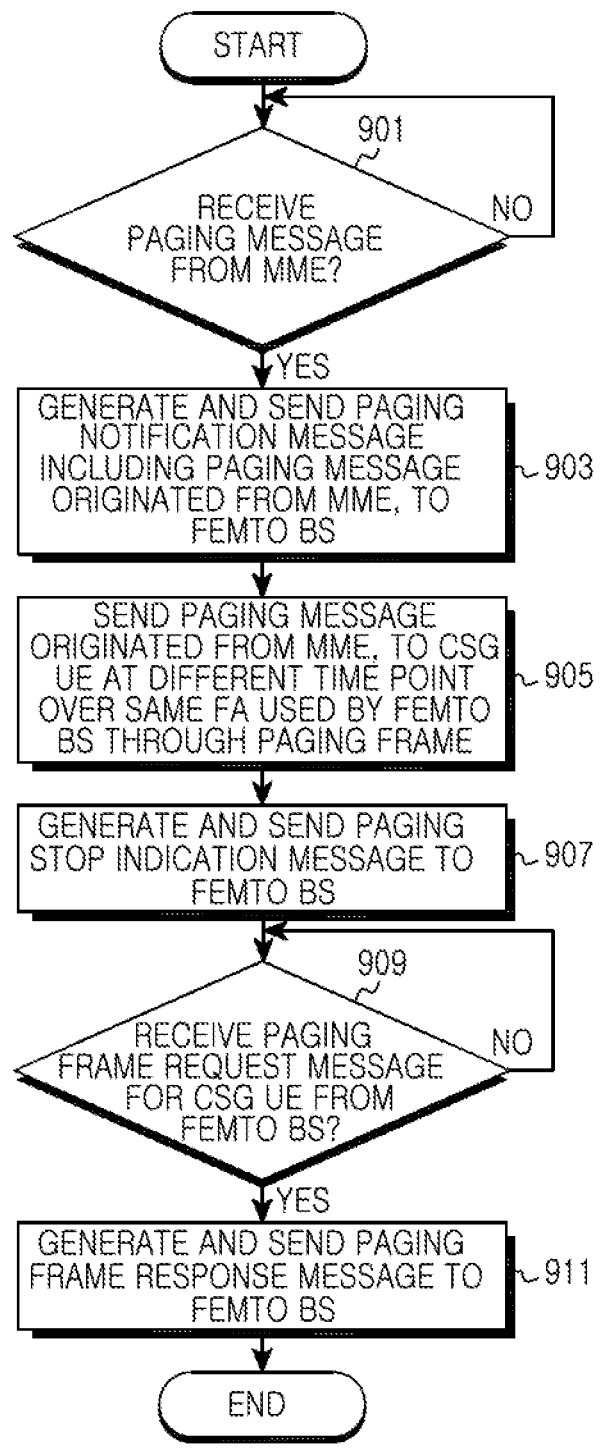
FIG. 9 is a flowchart of operations of a macro base station for sending a paging message to a CSG user equipment while a femto base station sends the paging message to the CSG user equipment using the same FA as the macro base station in a mobile communication system according to an exemplary embodiment of the present invention.

FIG. 9 is a flowchart of operations of a macro BS for sending a paging message to a CSG UE while the femto BS sends the paging message to the CSG UE using the same FA as the macro BS in a mobile communication system according to an exemplary embodiment of the present invention.

Referring to FIG. 9, in step 901, the macro BS determines whether the paging message destined for the CSG UE is received from the MME.

Upon receiving the paging message from the MME in step 901, the macro BS generates the paging notification message including the paging message received from the MME and sends the generated message to the femto BS in step 903.

In step 905, the macro BS forwards the paging message received from the MME to the CSG UE at a different time point over the same FA used by the femto BS through the paging frame of the CSG UE.

After forwarding the paging message received from the MME to the CSG UE, the macro BS generates and sends the paging stop indication message to the femto BS in step 907.

In step 909, the macro BS determines whether the paging frame request message for the CSG UE is received from the femto BS.

Upon receiving the paging frame request message for the CSG UE from the femto BS in step 909, the macro BS allocates the unused part of the paging frame to the femto BS, generates the paging frame response message including the allocation information; that is, including the information of the time when the macro BS uses the paging frame, and sends the generated message to the femto BS in step 911.

Next, the macro BS finishes this process.

Figure 10:
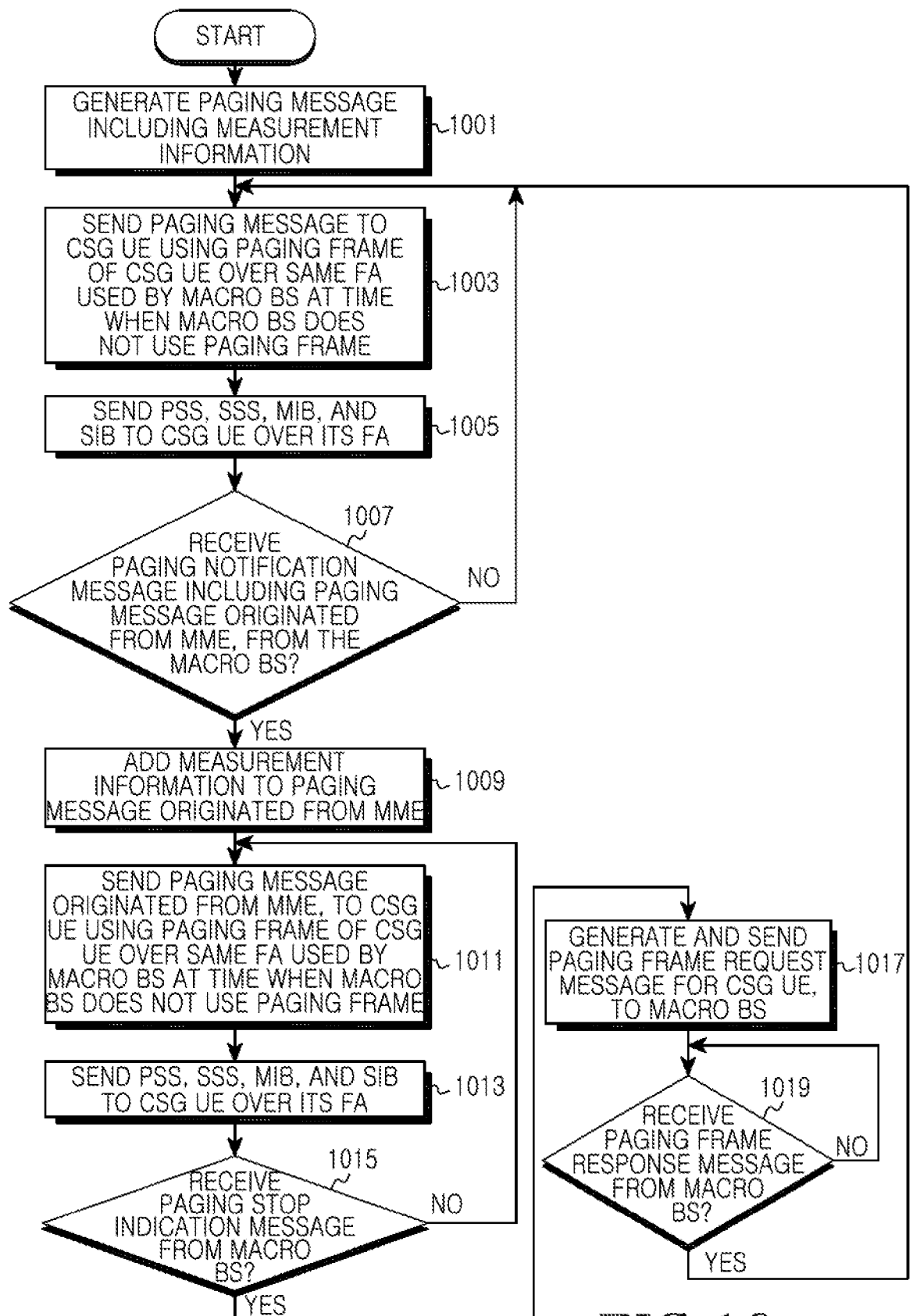
FIG. 10 is a flowchart of operations of a femto base station for a macro base station to send a paging message to a CSG user equipment while the femto base station sends the paging message to the CSG user equipment using the same FA as the macro base station in a mobile communication system according to an exemplary embodiment of the present invention.

FIG. 10 is a flowchart of operations of a femto BS for a macro BS to send a paging message to a CSG UE while the femto BS sends the paging message to the CSG UE using the same FA as the macro BS in a mobile communication system according to an exemplary embodiment of the present invention.

In step 1001, the femto BS generates the paging message including the measurement information to measure a signal from itself.

In step 1003, the femto BS sends the generated paging message to the CSG UE using the paging frame of the CSG UE over the same FA used by the macro BS at the time when the macro BS does not use the paging frame. Herein, the measurement information includes the FA and the PCID of the femto BS, if necessary, the GCID, and the femto BS name.

In step 1005, the femto BS transmits the PSS, the SSS, the MIB, and the SIB to the CSG UE through its FA.

In step 1007, the femto BS determines whether the paging notification message including the paging message originated from the MME is received from the macro BS.

When it is determined that no paging notification message, including the paging message originated from the MME, is received from the macro BS in step 1007, the femto BS returns to step 1003.

In contrast, when it is determined that the paging notification message, including the paging message originated from the MME, is received from the macro BS in step 1007, the femto BS adds the measurement information to the received paging message originated from the MME in step 1009.

In step 1011, the femto BS sends the paging message originated from the MME and added with the measurement information, to the CSG UE using the paging frame of the CSG UE over the same FA used by the macro BS at the time when the macro BS does not use the paging frame.

In step 1013, the femto BS sends the PSS, the SSS, the MIB, and the SIB to the CSG UE over its FA.

In step 1015, the femto BS determines whether the paging stop indication message is received from the macro BS.

When it is determined that the paging stop indication message is not received from the macro BS in step 1015, the femto BS returns to step 1011.

In contrast, when it is determined that the paging stop indication message is received from the macro BS in step 1015, the femto BS generates the paging frame request message for the CSG UE and sends the generated message to the macro BS in step 1017.

In step 1019, the femto BS determines whether the paging frame response message including the information of the time when the macro BS uses the paging frame is received from the macro BS. Upon receiving the paging frame response message, the femto BS returns to step 1003.

Figure 11:
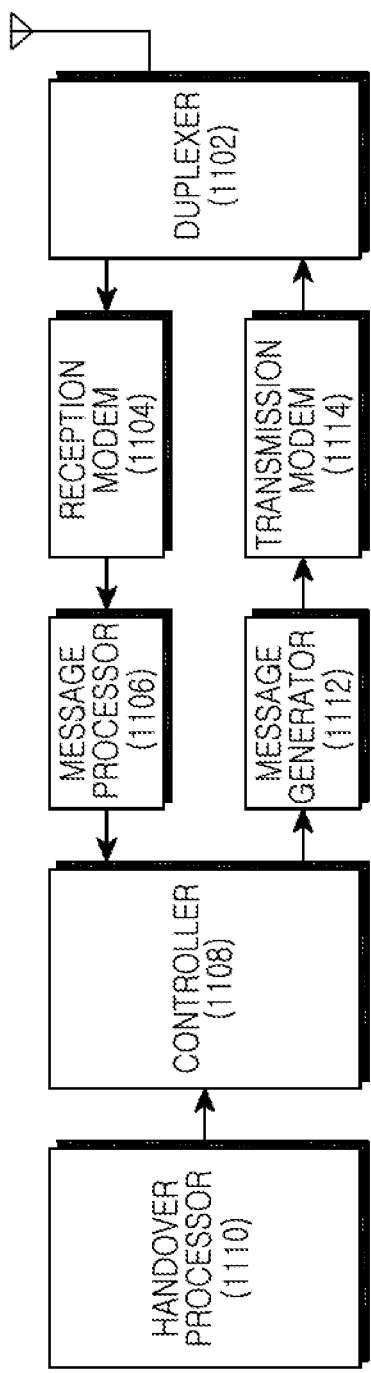
FIG. 11 is a block diagram of a macro base station, a femto base station, and a CSG user equipment in a mobile communication system according to an exemplary embodiment of the present invention.

FIG. 11 is a block diagram of a macro BS (or a femto BS or a CSG UE) in a mobile communication system according to an exemplary embodiment of the present invention. Herein, the macro BS, the femto BS, and the CSG UE have substantially the same structure. Thus, the operations of the macro BS, the femto BS, and the CSG UE are now explained using a single apparatus as an example.

Referring to FIG. 11, the macro BS (or the femto BS or the CSG UE) includes a duplexer 1102, a reception modem 1104, a message processor 1106, a controller 1108, a handover processor 1110, a message generator 1112, and a transmission modem 1114.

In the macro BS structure of FIG. 11, the duplexer 1102 transmits a transmit signal output from the transmission modem 1114 via an antenna and provides a signal received via the antenna to the reception modem 1104 according to the duplexing scheme.

The reception modem 1104 restores data from the signal output from the duplexer 1102 and sends the restored data to the message processor 1106. For example, the reception modem 1104 includes a Radio Frequency (RF) reception block, a demodulation block, and a channel decoding block. The RF reception block includes a filter and a RF preprocessor. When the wireless communication system adopts an Orthogonal Frequency Division Multiplexing (OFDM) scheme, the demodulation block includes a Fast Fourier Transform (FFT) operator for extracting data from subcarriers. The channel decoding block includes a demodulator, a deinterleaver, and a channel decoder.

The message processor 1106 decomposes the message received from the femto BS or the CSG UE via the reception modem 1104, and outputs the result to the controller 1108.

The controller 1108 controls the transmission and the reception of the macro BS. In more detail, the controller 1108 provides the handover processor 1110 with the handover related control information output from the message processor 1106, and provides the message generator 1112 with the handover related information output from the handover processor 1110.

The handover processor 1110 obtains the allowed CSG list which is the list of the CSG UEs that may access the femto BS, and the GCID from the femto BS by controlling the message processor 1106 to process the register request message received from a newly installed femto BS, and controlling the message generator 1112 to generate and send the register response message to the femto BS, allocates the PCID of the femto BS to the femto BS, and informs the femto BS of the allocated PCID and the FA and the SFN of the macro BS. When the UE enters the service coverage area of the macro BS according to the handover or when the idle UE in the service coverage area of the macro BS transitions to the connected mode, the handover processor 1110 examines whether the corresponding UE is a CSG UE that may access the femto BS by comparing the UE ID of the corresponding UE with the managed allowed CSG list of the femto BS. When determining that the UE is a CSG UE that may access the femto BS, the handover processor 1110 controls the message generator 1112 to generate and send the accessible UE HO notification message to the femto BS. The handover processor 1110 obtains the PCID and the GCID of the femto BS, which are acquired by the CSG UE through the measurement, by controlling the message processor 1106 to process the measurement report message received from the CSG UE, and determines whether to hand over the CSG UE based on the obtained information.

The message generator 1112 generates and outputs the message destined for the femto BS or the CSG UE, to the transmission modem 1114 under the control of the controller 1108.

The transmission modem 1114 converts the message or the transmit data output from the message generator 1112 into a form transmittable over the radio resource, and provides the converted form to the duplexer 1102. For example, the transmission modem 1114 includes a channel encoding block, a modulation block, and an RF transmission block. The channel encoding block includes a modulator, an interleaver, and a channel encoder. When the wireless communication system adopts the OFDM scheme, the modulation block includes an Inverse FFT (IFFT) operator for mapping the data to the subcarriers. The RF transmission block includes a filter and an RF preprocessor.

Next, in the femto BS structure of FIG. 11, the duplexer 1102 transmits a transmit signal output from the transmission modem 1114 via the antenna and provides a signal received via the antenna to the reception modem 1104 according to the duplexing scheme.

The reception modem 1104 restores data from the signal output from the duplexer 1102 and sends the restored data to the message processor 1106. For example, the reception modem 1104 includes an RF reception block, a demodulation block, and a channel decoding block. The RF reception block includes a filter and a RF preprocessor. When the wireless communication system adopts the OFDM scheme, the demodulation block includes an FFT operator for extracting data from subcarriers. The channel decoding block includes a demodulator, a deinterleaver, and a channel decoder.

The message processor 1106 decomposes the message received from the macro BS or the CSG UE via the reception modem 1104, and outputs the result to the controller 1108.

The controller 1108 controls the transmission and the reception of the femto BS. In more detail, the controller 1108 provides the handover processor 1110 with the handover related control information received from the message processor 1106, and provides the message generator 1112 with the handover related information output from the handover processor 1110.

By controlling the message generator 1112 to generate and send the register request message to the macro BS of its camping service coverage area and controlling the message processor 1106 to process the register response message received from the macro BS, the handover processor 1110 informs the macro BS of the allowed CSG list which is the list of the CSG UEs that may access the femto BS, and the GCID, and obtains the PCID allocated to the femto BS and the FA and the SFN of the macro BS from macro BS. The handover processor 1110 acquires the FA and the SFN of the macro BS, the PCID of the femto BS, the UE ID of the CSG UE, and the information such as use time of the paging frame by controlling the message processor 1106 to process the accessible UE NO notification message received from the macro BS, and synchronizes the paging frame using the acquired FA and SFN of the macro BS. Next, the handover processor 1110 controls the message generator 1112 to generate and send the paging message informing of the existence of the femtocell, to the CSG UE. Herein, the paging message is transmitted to the CSG UE using the paging frame of the CSG UE over the same FA used by the macro BS at the time when the macro BS does not use the paging frame, and may include the measurement information of the femto BS. Next, the handover processor 1110 controls the transmission modem 1114 to send the PSS, the SSS, the MIB, and the SIB to the CSG UE over the FA (e.g., f2) of the femto BS.

The message generator 1112 generates and outputs the message destined for the macro BS or the CSG UE, to the transmission modem 1114 under the control of the controller 1108.

The transmission modem 1114 converts the message or the transmit data output from the message generator 1112 into a form transmittable over the radio resource, and provides the converted form to the duplexer 1102. For example, the transmission modem 1114 includes a channel encoding block, a modulation block, and an RF transmission block. The channel encoding block includes a modulator, an interleaver, and a channel encoder. When the wireless communication system adopts the OFDM scheme, the modulation block includes an IFFT operator for mapping the data to the subcarriers. The RF transmission block includes a filter and an RF preprocessor.

Now, in the CSG UE structure of FIG. 11, the duplexer 1102 transmits a transmit signal output from the transmission modem 1114 via an antenna and provides a signal received via the antenna to the reception modem 1104 according to the duplexing scheme.

The reception modem 1104 restores data from the signal output from the duplexer 1102 and sends the restored data to the message processor 1106. For example, the reception modem 1104 includes an RF reception block, a demodulation block, and a channel decoding block. The RF reception block includes a filter and a RF preprocessor. When the wireless communication system adopts the OFDM scheme, the demodulation block includes an FFT operator for extracting data from subcarriers. The channel decoding block includes a demodulator, a deinterleaver, and a channel decoder.

The message processor 1106 decomposes the message received from the macro BS or the femto BS via the reception modem 1104, and outputs the result to the controller 1108.

The controller 1108 controls the transmission and the reception of the CSG UE. In more detail, the controller 1108 provides the handover processor 1110 with the handover related control information received from the message processor 1106, and provides the message generator 1112 with the handover related information output from the handover processor 1110.

The handover processor 1110 obtains the measurement information of the femto BS by controlling the message processor 1106 to process the paging messages received from the macro BS and the femto BS over the same FA at different times through the paging frame. The handover processor 1110 obtains the PCID and the GCID of the femto BS by controlling the message processor 1106 to receive and decode the PSS, the SSS, the MIB, and the SIB from the femto BS using the measurement information. Next, the handover processor 1110 controls the message generator 1112 to generate and send the measurement report message including the obtained PCID and GCID of the femto BS, to the macro BS.

The message generator 1112 generates and outputs the message destined for the macro BS or the femto BS, to the transmission modem 1114 under the control of the controller 1108.

The transmission modem 1114 converts the message or the transmit data output from the message generator 1112 into a form transmittable over the radio resource, and provides the converted form to the duplexer 1102. For example, the transmission modem 1114 includes a channel encoding block, a modulation block, and an RF transmission block. The channel encoding block includes a modulator, an interleaver, and a channel encoder. When the wireless communication system adopts the OFDM scheme, the modulation block includes an IFFT operator for mapping the data to the subcarriers. The RF transmission block includes a filter and an RF preprocessor.

As constructed above, the controller 1108 controls the message processor 1106, the handover processor 1110, and the message generator 1112. Herein, the controller 1108 may function as one or more of the message processor 1106, the handover processor 1110, and the message generator 1112. While the components described above are illustrated and described as being separately constituted to distinguish their functions, in a real implementation, the controller 1108 may process all or part of the functions of the message processor 1106, the handover processor 1110, and the message generator 1112.

In this exemplary embodiment, the femto BS sends the paging message by adding its measurement information to the paging message transmitted from the macrocell. When the paging message from the macro BS and the paging message from the femto BS overlap, the femto BS may change and send its paging message to the paging message transmitted by the macro BS. Thus, the interference between the macro BS and the femto BS may be minimized.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operating method of a femto base station (BS) in a mobile communication system where the femto BS and a macro BS coexist, the method comprising:
receiving, at the femto BS, a notification message including a paging resource information from the macro BS;
generating a paging message based on the paging resource information;
and sending, to a user equipment (UE), the generated paging message over a frequency assignment (FA) of the macro BS, wherein the notification message indicates both, that the UE is registered to the femto BS and that the UE is located in a service coverage of the macro BS, wherein the paging message comprises information indicating a frequency assignment of the femto BS and indicating the existence of the femto BS to be measured by the UE, and is sent based on a paging frame response message received from the macro BS, wherein the paging frame response message comprises paging frame allocation information, and corresponds to a paging frame request message transmitted from the femto BS to the macro BS, and wherein the paging frame request message requests to allocate a paging frame allocated to the UE.

2. The method of claim 1, wherein the notification message is an accessible UE handover (HO) notification message and comprises at least one of the FA and system frame number (SFN) of the macro BS, a physical cell identifier (PCID) of the femto BS, an identifier (ID) of the UE, and paging frame allocation information.

3. The method of claim 2, further comprising:

synchronizing with the macro BS using the SFN of the macro BS.

4. The method of claim 1, wherein the UE is in a connection mode within the service coverage area of the macro BS.

5. The method of claim 1, wherein the paging message is transmitted using a paging frame of the UE over the FA of the macro BS at a time when the macro BS does not use the paging frame.

6. The method of claim 1, wherein the paging message comprises measurement information for the measurement of the signal from the femto BS, wherein the measurement information comprises at least one of a physical cell identifier (PCID), a global cell identifier (GCID), and a femto BS name of the femto BS.

7. The method of claim 1, further comprising:

sending, from the femto BS, at least one of a primary synchronization signal (PSS), a secondary synchronization signal (SSS), a master information block (MIB), and a system information block (SIB) to the UE over the FA of the femto BS.

8. The method of claim 1, further comprising:

generating, at the femto BS, a paging stop request message to request to release the allocated paging frame, and sending the generated paging stop request message to the macro BS; and when receiving, at the femto BS, the paging stop response message from the macro BS, ending the transmission of the paging message.

9. The method of claim 1, further comprising:

generating, at the femto BS, a register request message comprising at least one of a list of UEs registered to the femto BS and a global cell identifier (GCID) of the femto BS;

sending the generated register request message to a macro BS of the service coverage area where the femto BS is located; and receiving, at the femto BS, a register response message comprising at least one of the FA and a system frame number (SFN) of the macro BS and a physical cell identifier (PCID) allocated by the macro BS to the femto BS, from the macro BS of the service coverage area where the femto BS is located.

10. The method of claim 1, further comprising:

when receiving, at the femto BS, a paging notification message comprising a paging message originated from a mobility management entity (MME), from the macro BS, adding the measurement information of the femto BS to the paging message originated from the MME; and sending the paging message originated from the MME and added with the measure information, to the UE.

11. The method of claim 10, further comprising:

when receiving, at the femto BS, a paging stop indication message from the macro BS, generating and sending a paging frame request message to request the allocation of the paging frame allocated to the UE, to the macro BS; and receiving, at the femto BS, a paging frame response message comprising paging frame allocation information from the macro BS.

12. An operating method of a user equipment (UE) in a mobile communication system where a femto base station (BS) and a macro BS coexist, the method comprising:

receiving, at the UE, a paging message from the femto BS over a frequency assignment (FA) of the macro BS;

measuring a signal from the femto BS based on the received paging message; and generating and sending a measurement report message comprising a measurement result to the macro BS, wherein the paging message comprises information indicating a FA of the femto BS and indicating the existence of the femto BS to be measured by the UE, which is registered to the femto BS and is located in a service coverage area of the macro BS, and is sent, from the femto BS, based on a paging frame response message received from the macro BS, wherein the paging frame response message comprises paging frame allocation information, and corresponds to a paging frame request message transmitted from the femto BS to the macro BS, and wherein the paging frame request message requests to allocate a paging frame allocated to the UE.

13. The method of claim 12, wherein the UE is in a connection mode within the service coverage area of the macro BS.

14. The method of claim 12, wherein the paging message is received using a paging frame of the UE over the FA of the macro BS at a time when the macro BS does not use the paging frame.

15. The method of claim 12, wherein the paging message comprises measurement information for the measurement of the signal from the femto BS, wherein the measurement information comprises at least one of a physical cell identifier (PCID), a global cell identifier (GCID), and a femto BS name of the femto BS.

16. The method of claim 15, wherein the measuring of the femto BS comprises:

using the measurement information, receiving at least one of a primary synchronization signal (PSS), a secondary synchronization signal (SSS), a master information block (MIB), and a system information block (SIB) over the FA of the femto BS from the femto BS; and obtaining at least one of the PCID and the GCID of the femto BS by decoding at least one of the received PSS, SSS, MIB, and SIB.

17. An apparatus of a femto base station (BS) in a mobile communication system where the femto BS and a macro BS coexist, the apparatus comprising:

a reception modem configured to receive a notification message including a paging resource information from the macro BS;

a message generator configured to generate a paging message based on the paging resource information; and a transmission modem configured to send the generated paging message to a user equipment (UE) over a frequency assignment (FA) of the macro BS, wherein the notification message indicates both, that the UE is registered to the femto BS and that the UE is located in a service coverage area of the macro BS, wherein the paging message comprises information indicating a FA of the femto BS and indicating the existence of the femto BS to be measured by the UE, is sent based on a paging frame response message received from the macro BS, wherein the paging frame response message comprises paging frame allocation information, and corresponds to a paging frame request message transmitted from the femto BS to the macro BS, and wherein the paging frame request message requests to allocate a paging frame allocated to the UE.

18. The apparatus of claim 17, wherein the notification message is the accessible UE HO notification message and comprises at least one of the FA and a system frame number (SFN) of the macro BS, a physical cell identifier (PCID) of the femto BS, an identifier (ID) of the UE, and paging frame allocation information.

19. The apparatus of claim 18, further comprising:

a handover processor configured to synchronize with the macro BS using the SFN of the macro BS.

20. The apparatus of claim 17, wherein the UE is in a connection mode within the service coverage area of the macro BS.

21. The apparatus of claim 17, wherein the paging message is transmitted using a paging frame of the UE over the FA of the macro BS at a time when the macro BS does not use the paging frame.

22. The apparatus of claim 17, wherein the paging message comprises measurement information of the femto BS, wherein the measurement information comprises at least one of a physical cell identifier (PCID), a global cell identifier (GCID), and a femto BS name of the femto BS.

23. The apparatus of claim 17, wherein the transmission modem sends at least one of a primary synchronization signal (PSS), a secondary synchronization signal (SSS), a master information block (MIB), and a system information block (SIB) to the UE over the FA of the femto BS.

24. The apparatus of claim 17, wherein the message generator generates a paging stop request message to request to release the allocated paging frame, the transmission modem sends the generated paging stop request message to the macro BS, the reception modem receives the paging stop response message from the macro BS, and the transmission modem ends the transmission of the paging message according to the reception of the paging stop response message.

25. The apparatus of claim 17, wherein the reception modem receives a register response message comprising at least one of the FA and a system frame number (SFN) of the macro BS and a physical cell identifier (PCID) allocated by the macro BS to the femto BS, from the macro BS of the service coverage area where the femto BS is located, and wherein the message generator generates a register request message comprising at least one of a list of UEs registered to the femto BS and a global cell identifier (GCID) of the femto BS, and the transmission modem sends the generated register request message to a macro BS of the service coverage area where the femto BS is located.

26. The apparatus of claim 17, wherein the reception modem receives a paging notification message comprising a paging message originated from a mobility management entity (MME), from the macro BS, and wherein the message generator adds the measurement information of the femto BS to the paging message originated from the MME, and the transmission modem sends the paging message originated from the MME and added with the measure information, to the UE.

27. The apparatus of claim 26, wherein the reception modem receives a paging stop indication message from the macro BS, the message generator generates a paging frame request message to request the allocation of the paging frame allocated to the UE, according to the reception of the paging stop indication message, the transmission modem sends the generated paging frame request message to the macro BS, and the reception modem receives a paging frame response message comprising paging frame allocation information from the macro BS.

28. An apparatus of a user equipment (UE) in a mobile communication system where the UE is registered with a femto base station (BS) and the femto BS and a macro BS coexist, the apparatus comprising:

a reception modem configured to receive a paging message from the femto BS over a frequency assignment (FA) of the macro BS;

a handover processor configured to measure a signal from the femto BS based on the received paging message;

a message generator configured to generate a measurement report message comprising a measurement result; and a transmission modem configured to send the generated measurement report message to the macro BS, wherein the paging message comprises information indicating a FA of the femto BS and indicating the existence of the femto BS to be measured by the UE, which is registered to the femto BS and is located in a service coverage area of a macro BS, is sent, from the femto BS, based on a paging frame response message received from the macro BS, wherein the paging frame response message comprises paging frame allocation information, and corresponds to a paging frame request message transmitted from the femto BS to the macro BS, and wherein the paging frame request message requests to allocate a paging frame allocated to the UE.

29. The apparatus of claim 28, wherein the UE is in a connection mode within the service coverage area of the macro BS.

30. The apparatus of claim 28, wherein the paging message is received using a paging frame of the UE over the FA of the macro BS at a time when the macro BS does not use the paging frame.

31. The apparatus of claim 28, wherein the paging message comprises measurement information of the femto BS, wherein the measurement information comprises at least one of a physical cell identifier (PCID), a global cell identifier (GCID), and a femto BS name of the femto BS.

32. The apparatus of claim 31, wherein the handover processor receives at least one of a primary synchronization signal (PSS), a secondary synchronization signal (SSS), a master information block (MIB), and a system information block (SIB) over the FA of the femto BS from the femto BS using the measurement information by controlling the reception modem, and obtains at least one of the PCID and the GCID of the femto BS by decoding at least one of the received PSS, SSS, MIB, and SIB.

\* \* \* \* \*